United States Patent [19]
Kubatzki

[11] Patent Number: 5,881,020
[45] Date of Patent: Mar. 9, 1999

[54] APPARATUS AND METHOD FOR DATE SETTING FOR ELECTRONICALLY CONTROLLED POSTAGE METERS

[75] Inventor: Ralf Kubatzki, Berlin, Germany

[73] Assignee: Siemens Aktiengesellschaft, Munich, Germany

[21] Appl. No.: 657,515

[22] Filed: Jun. 3, 1996

[51] Int. Cl.⁶ .......................... G04B 47/00; G07B 17/02
[52] U.S. Cl. .......................... 368/10; 368/268; 705/408; 705/418
[58] Field of Search .................. 368/10, 28, 29; 101/91; 235/375, 377, 381, 441, 492; 346/20, 80, 81; 341/400, 406, 464, 466, 569; 705/408, 418

[56] References Cited

U.S. PATENT DOCUMENTS

| | | | |
|---|---|---|---|
| 4,060,720 | 11/1977 | Check, Jr. | 235/309 |
| 4,335,441 | 6/1982 | Baumann et al. | 364/580 |
| 4,398,458 | 8/1983 | Denzin et al. | 101/91 |
| 4,424,567 | 1/1984 | Yasutake | 364/405 |
| 4,649,489 | 3/1987 | Denzin | 364/464 |
| 4,876,956 | 10/1989 | Riley et al. | 101/91 |
| 5,197,042 | 3/1993 | Brookner et al. | 368/10 |

*Primary Examiner*—Vit W. Miska
*Attorney, Agent, or Firm*—Herbert L. Lerner; Laurence A. Greenberg

[57] ABSTRACT

An electronically controlled postage meter with easier user setting of the date. Postage values are input via a keyboard connected to a control device. The control device automatically counts upwardly for incrementing a date. The upward incrementation can be prevented with a function key. The control device compares the entered date with the date stored in the calendar module and changes the date to be printed, depending on the comparison. The control device then outputs a print command for printing a postage imprint with a new, changed or current date. The method includes automatic counting upward for incrementing the date. Actuating the function key to selectively prevent at least the automatic incrementation of the date. It is also possible to reset the setting of the current date by either actuating the function key again or by actuating an additional function key.

20 Claims, 7 Drawing Sheets

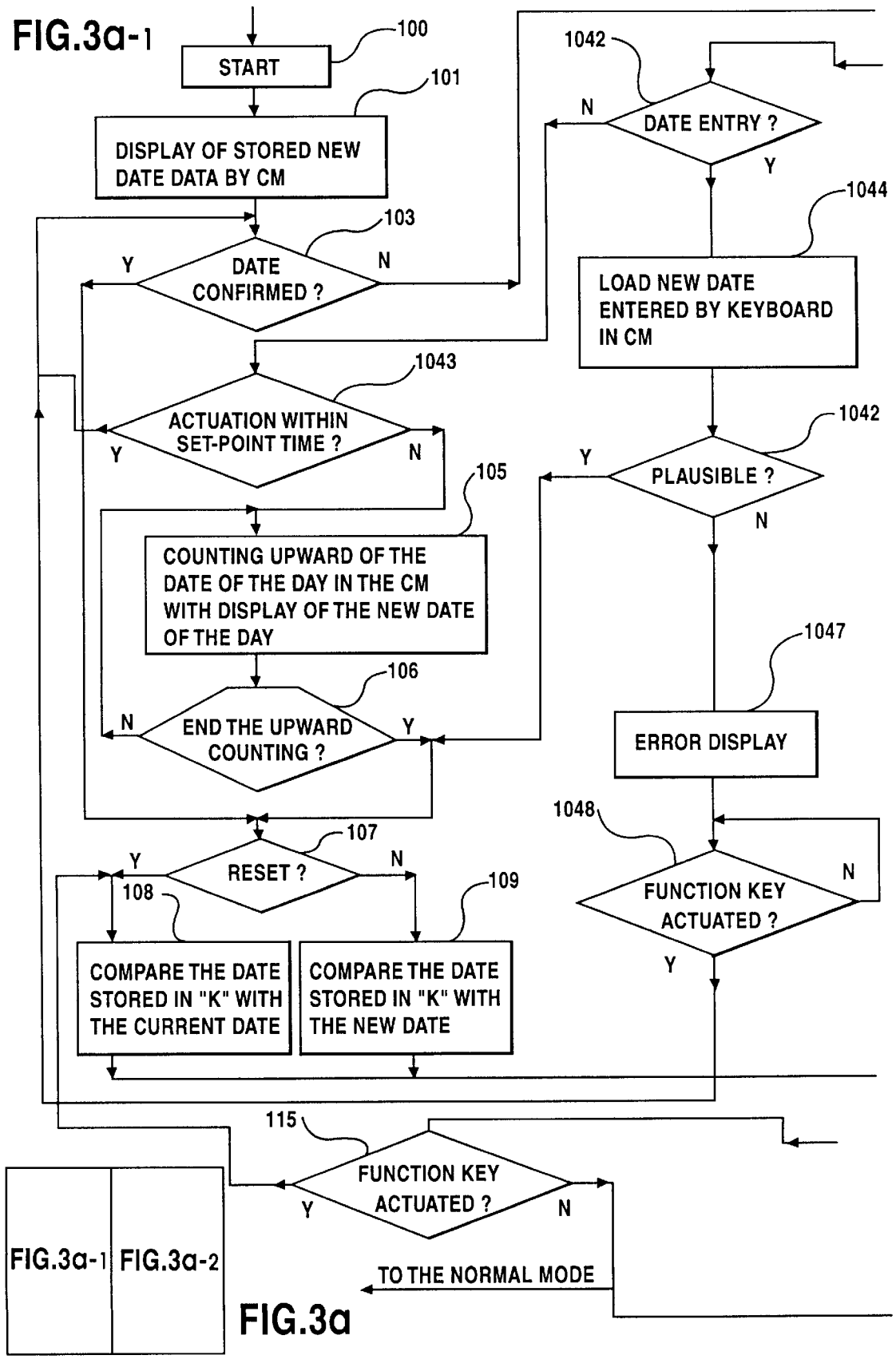

APPARATUS AND METHOD FOR DATE SETTING FOR ELECTRONICALLY CONTROLLED POSTAGE METERS

BACKGROUND OF THE INVENTION

FIELD OF THE INVENTION

The invention relates to an apparatus and a method for setting the date in an electronically controlled postage meter with a mechanical print mechanism or a nonmechanical printer.

Dates as set by hand in prior art postage meters, by using a simple tool. For instance, the individual type wheels of the date mechanism are rotated using a pencil or the like; alternatively, special knurled setting devices or key-controlled levers are provided. Using an additional tool requires precautions to prevent its being lost, and a knurled setting device or a lever requires additional mechanical means to secure against unintentional setting. Due to the fact that the type wheels are disposed inside the postage meter, further additional security precautions are necessary that prevent the machine from being operated during the date setting procedure.

The numbers on the type wheels are also relatively small and relatively difficult to make out as printed type, so that misadjustments occur frequently.

Mechanical date setting is therefore unreliable, and it is mechanically complicated and economically expensive.

It has become known, heretofore, from U.S. Pat. No. 4,398,458 (German DE-OS 31 11 949), to actuate additional type wheels by means of stepping motors and specifically embodied racks. The stepping motors are controlled from a keyboard, and the setting of the racks is monitored by an electronic logic, such as a microprocessor in conjunction with registers, memories and sensors, as can be learned for instance from German patent No. 31 11 953 and U.S. Pat. No. 4,335,441 (German DE-OS 29 16 811).

U.S. Pat. No. 4,649,489 to Denzin teaches a method for date setting for electronically controlled postage meters which does not require the above-mentioned additional mechanical securing means and which thus does not have the disadvantages discussed above. The method for setting the type wheels of the date print mechanism in electronically controlled postage meters that have stepping motors and means moved thereby to adjust the type wheels to print the postage values and optional imprint cylinders is tailored only to a mechanical print mechanism, however.

SUMMARY OF THE INVENTION

It is accordingly an object of the invention to provide a method and device for date-setting in electronically controlled postage meters with mechanical or non-mechanical print mechanisms, which overcomes the above-mentioned disadvantages of the heretofore-known devices and methods of this general type and which makes entry and setting easier for the user.

With the foregoing and other objects in view there is provided, in accordance with the invention, an electronically controlled postage meter, comprising:
- a control device controlling functions of the postage meter, a printer module connected to the control device, a calendar module connected to the control device with a memory for storing at least one current date;
- a keyboard connected to the control device for inputting postage values and inputting dates into the control device, the control device including means for automatically counting upward for incrementing a date;
- a function key connected to the control device for selectively preventing upwardly incrementing the date;
- the control device comparing the entered date with the date stored in the calendar module and changing the date to be printed in dependence on the comparison; and
- the control device outputting a print command for printing a postage imprint with a new, changed or current date.

In accordance with an added feature of the invention, control device is an electronic logic circuit with (a) means for automatically counting upward for incrementing the date; and (b) means responsive to an actuation of the function key for selectively preventing an automatic predating of the date.

In accordance with additional feature of the invention, the electronic logic circuit is responsive to a further actuation of the function key for resetting the setting to the current date. In the alternative, there is provided a second function key, the actuation of which triggers the resetting of the incrementation.

In other words, an apparatus for date setting in electronically controlled postage meters is equipped with a printer and an associated control device, a battery-backed-up calendar module for storing at least one current date in memory, the module being connected to the control device, and a keyboard connected to the control device for inputting the postage value and for entering dates into the control device.

The improvement of the apparatus is characterized with the following features:
a) a keyboard for setting the date and the postage values in combination with a function key for the date setting and means for automatically counting upward for incrementing the date;
b) a function key for preventing at least the incrementing of the date;
c) an electronic logic circuit which compares the entered date with the previously stored date; and
d) the electronic logic circuit issuing a print command with the date.

A calendar module as referred to herein is a nonvolatile memory that handles calendar data and stores them. Such calendar data are the conventional date for the location (current date), and as a second date a future date (new date) required for predating, or a difference from the current date. The calendar module continuously furnishes at least the current date upon querying by the control device.

A function key connected to the control device determines the type of entry, i.e., the entry of the date, the postage value or other data. If a change of the date in conjunction with predating to a new date is entered, then the control device triggers a comparison between the changed date and the date previously stored in the memory, in order to optionally change the date to be printed. The electronic logic circuit then outputs a print command and prints a postage imprint including the new or changed or current date.

The electronic logic circuit according to the invention is equipped with hardware and/or software for
- automatically counting upward for incrementing the date; and
- reacting to the actuation of the function key in order to prevent at least the automatic predating of the date.

The electronic logic circuit also reacts to a further actuation of the aforementioned function key for resetting the setting to the current date. Alternatively, the electronic logic circuit reacts to an actuation of a further function key to reset the setting to the current date.

The novel method may be summarized as follows: automatically counting upward to increment the date; and preventing an automatic predating of the date as a consequence of an actuation of the function key.

With the foregoing and other objects in view, there is provided, in accordance with the invention, a method for setting the date in an electronically controlled postage meter (the postage meter including an electronic logic circuit and a calendar module, a date print mechanism with date wheels for printing a date, and a postage print mechanism with print wheels for printing postage values). The method comprises: storing at least one current date in a memory of the calendar module connected to the electronic logic circuit;

setting postage values and inputting data into the electronic logic circuit through a keyboard connected to the electronic logic circuit;

inputting a date through a function key connected to the electronic logic circuit;

comparing, with the electronic logic circuit, the date received in the inputting step with the current date stored in the calendar module memory;

if the dates are found to be different in the comparing step, indexing the date wheels in the date print mechanism, by activating the stepping motors with the electronic logic circuit coupled to the stepping motors;

repeating the comparing and indexing steps until the dates are found to be identical in the comparing step;

automatically counting upward with the electronic control unit for predating the date; and actuating the function key in order to prevent at least an automatic predating of the date.

In accordance with the invention, the method further comprises a step of actuating the function key once more or actuating a second function key for preventing the predating and for resetting the setting to the current date.

In accordance with another mode of the invention, the method further comprises storing in the non-volatile calendar module memory the current date and a difference between the new date and the current date; and setting the difference from the current date to zero upon turning on the postage meter and upon actuating the function key.

In accordance with again an added mode of the invention, the method further comprises acknowledging the new date by actuating the function key; initiating an automatic setting of the new date by actuating the function key again; and initiating a manual setting of the new date by actuating selected number keys in combination with the function key; and performing a plausibility check with the electronic logic circuit so as to enable only date predating with plausible dates.

In accordance with another mode of the invention, the method comprises automatically indexing with the electronic control unit for incrementing the date; actuating a first function key for acknowledging the new date and, selectively, actuating a second function key for resetting the new date to the current date.

Alternatively, the improvement in the method comprises automatically indexing upward with the electronic control unit for incrementing the date; actuating the function key in order to prevent at least an automatic incrementing of the date, inputting data in the keyboard, and transmitting an input signal from the keyboard to the electronic logic circuit, for entering digits, comparing, and setting the date wheels.

In accordance with again another mode of the invention, the method further comprises, subsequently to the inputting step, checking whether or not a plausible date has been entered in the inputting step, and returning to the inputting step if a function key is actuated.

In accordance with yet another mode of the invention, manual date entry is allowed for only a predetermined time period and, if no manual entry is made during the predetermined time period, the date and/or predating incrementation is automatically set.

Alternatively, the improved method comprises automatically indexing upward with the electronic control unit for incrementing the date; actuating the function key in order to prevent at least an automatic incrementing of the date, inputting data in the keyboard, and transmitting an input signal from the keyboard to the electronic logic circuit, for entering a code, comparing, and setting the date wheels.

Furthermore, a code word may be entered as the code which is not suitable as a data word for incrementing the date.

Other features which are considered as characteristic for the invention are set forth in the appended claims.

Although the invention is illustrated and described herein as embodied in an apparatus and method for date setting for electronically controlled postage meters, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
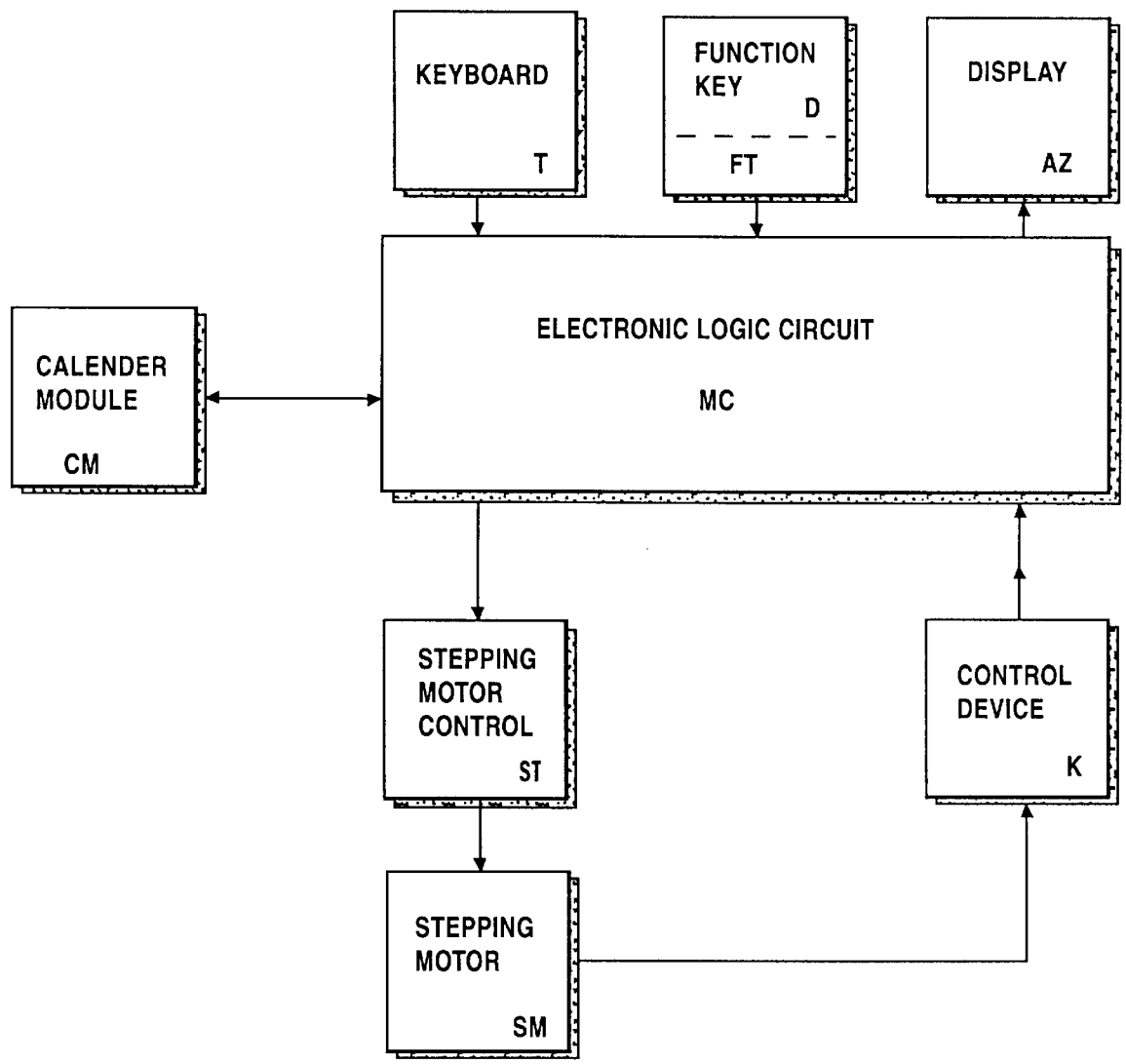
FIG. 1*a* is a block diagram referring to a mechanical print mechanism.

Referring now to the figures of the drawing in detail and first, particularly, to FIG. 1*a* thereof, the block circuit diagram depicted therein is equivalent to the block circuit diagram shown in U.S. Pat. No. 4,649,489 for a mechanical print mechanism.

For setting the date, the existing postage value keyboard T is used to set the postage values of a postage meter. The date appears on the alphanumeric display device AZ, which is preferably an LCD display, of the machine. After actuation of a function key D, the electronic logic MC compares the date entered with the set value and via the stepping motor control device ST causes the type wheels of the data mechanism to be adjusted by the stepping motors SM. Via a control device K, the positions of the stepping motors SM are compared with the predetermined values of the electronic logic MC. A calendar module CM is connected to the electronic logic MC.

The function key D for the date setting, like other function keys for setting the postage value and/or the optional imprint cylinders, which are to be actuated before or after the input of a value, can be actuated given suitable programming even without numerical or code inputs via the 10-key keyboard for setting the postage values.

For entering the date, the machine logic may for instance be configured such that only a new date that follows chronologically after the date stored in memory in the machine can be set, so that date resetting can be done only to the current date, which the calendar module CM provides even when the postage meter is in the off state.

The new date or the change from the current date is stored in the battery-backed-up calendar module CM. The component DF 1642 made by Dallas Semiconductor, with a battery life predicted to last at least 10 years and, accordingly, a data content on the order of an EEPROM, is suitable as a calendar module, for example. It is advantageous to have an unlimited number of write cycles combined with short read and write access times for an internal 2Kx8NV SRAM.

Figure 1B:
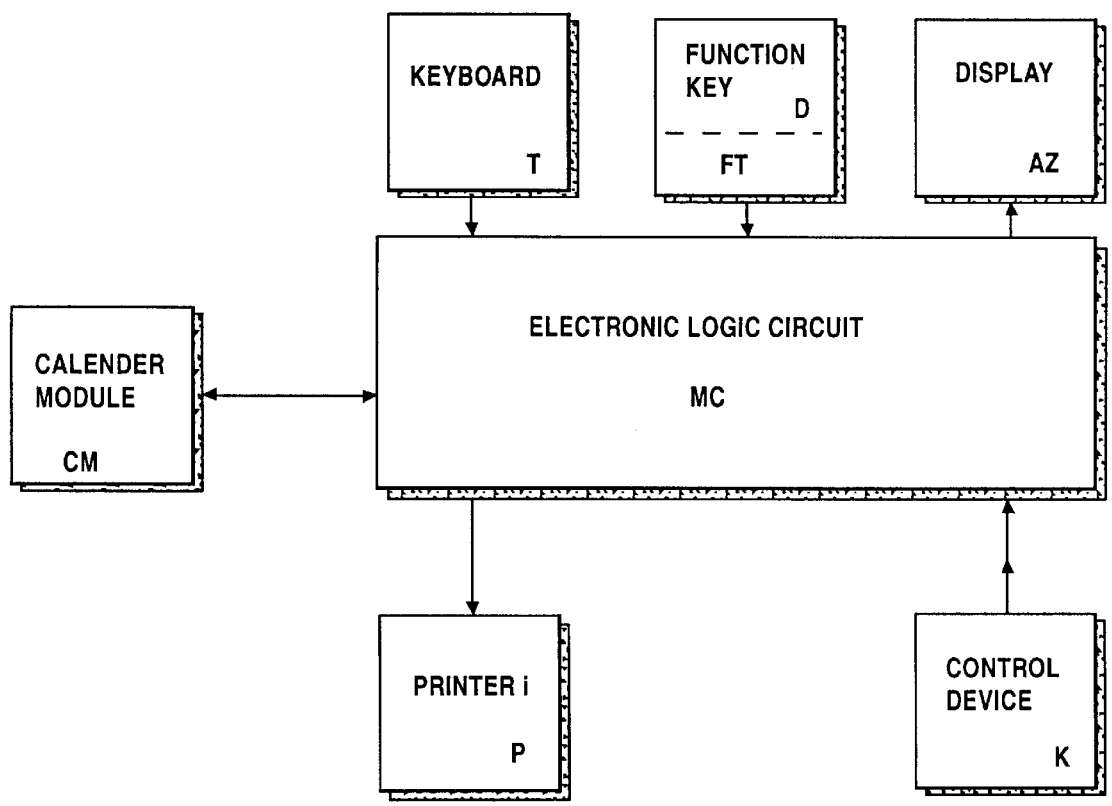
FIG. 1*b* is a block diagram referring to a nonmechanical print mechanism.

Referring now to FIG. 1b, there is shown a block circuit diagram for an exemplary embodiment with a nonmechanical printer. A display device AZ, keyboard T, at least one additional function key FT, D and a calendar module CM are connected to the electronic logic MC. A printer P is connected to the logic MC. The display device AZ is preferably an LCD display. After actuation of a function key D, the electronic logic MC compares the input date with the set value and causes printing with the suitably chosen date.

Figure 2A:
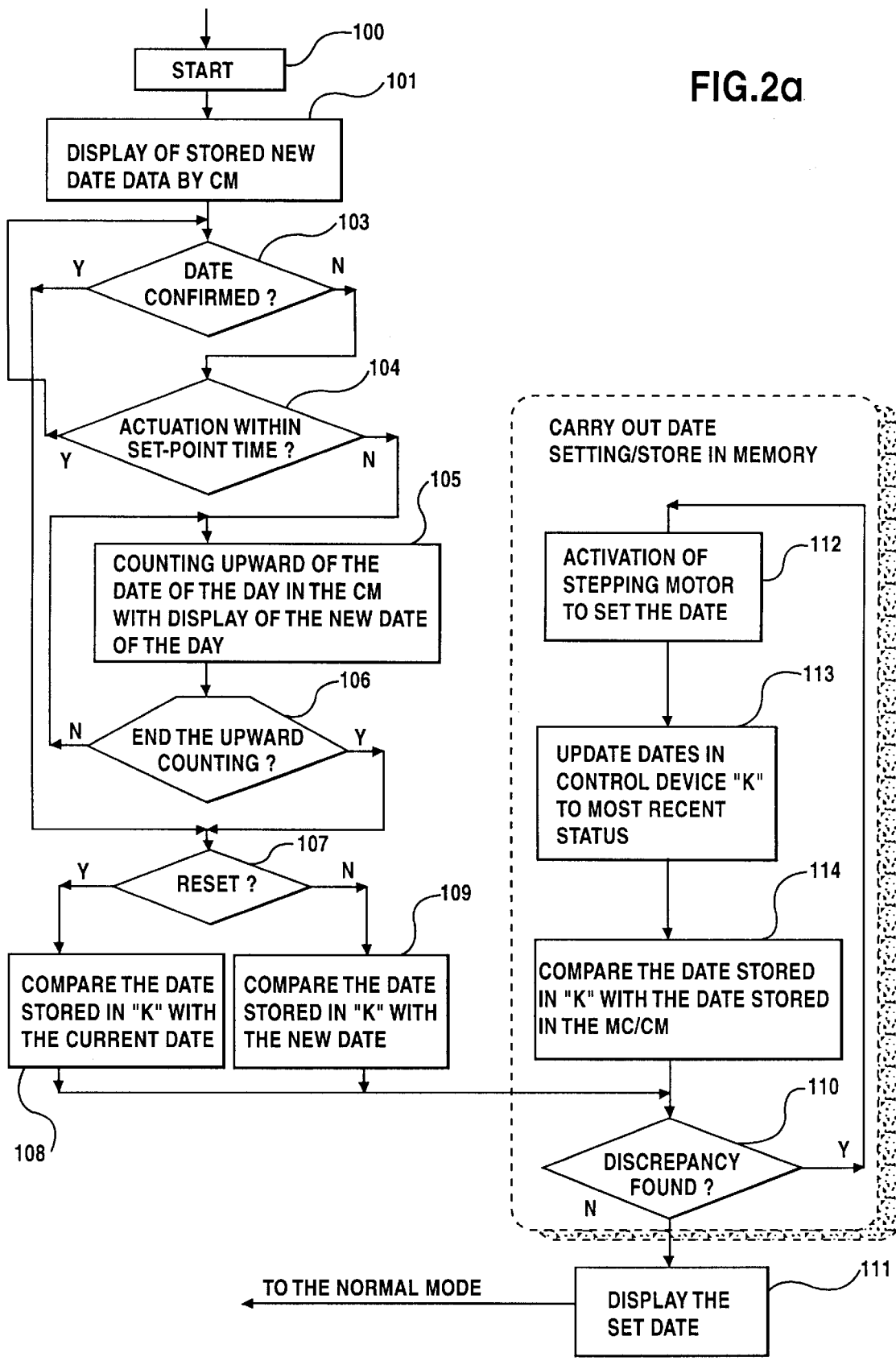
FIG. 2*a* is a flowchart for a mechanical print mechanism.

Referring now to FIG. 2a, the flowchart for date setting is related with the configuration of FIG. 1a as an example. After the postage meter is turned on and initialized, the calendar module CM is polled by the electronic control device, and the new date is displayed. If no predating has been set—that is, if the difference from the current date is zero—then the new date and the current date are the same. Consequently, the current date is displayed in step 101.

During the preceding initialization in step 100, although the measured date has been taken from a nonvolatile memory of the control device K, nevertheless no display of the instantaneous date setting of the type wheels was made. Once the date is displayed in step 101, then in step 103 the entry keyboard is queried as to whether or not the user wishes to make any entries. If no change in the dating is to be done, then via step 107, step 109 is reached and later step 110 is reached.

In step 110, the discrepancy is evaluated, for instance after in step 108 the current date from the calendar module is compared with the instantaneous date that corresponds to the type wheel setting. If no discrepancy is found, then—as already described in U.S. Pat. No. 4,649,489—step 111 is reached. If a discrepancy is found, however, then—as also already described in U.S. Pat. No. 4,649,489—a number of steps 112–114 are performed in order to set the type wheels for the date. Before step 112 is reached, a step 115 can be performed in order to reset the entry to the current date (FIG. 3).

Figures 2, 3A:
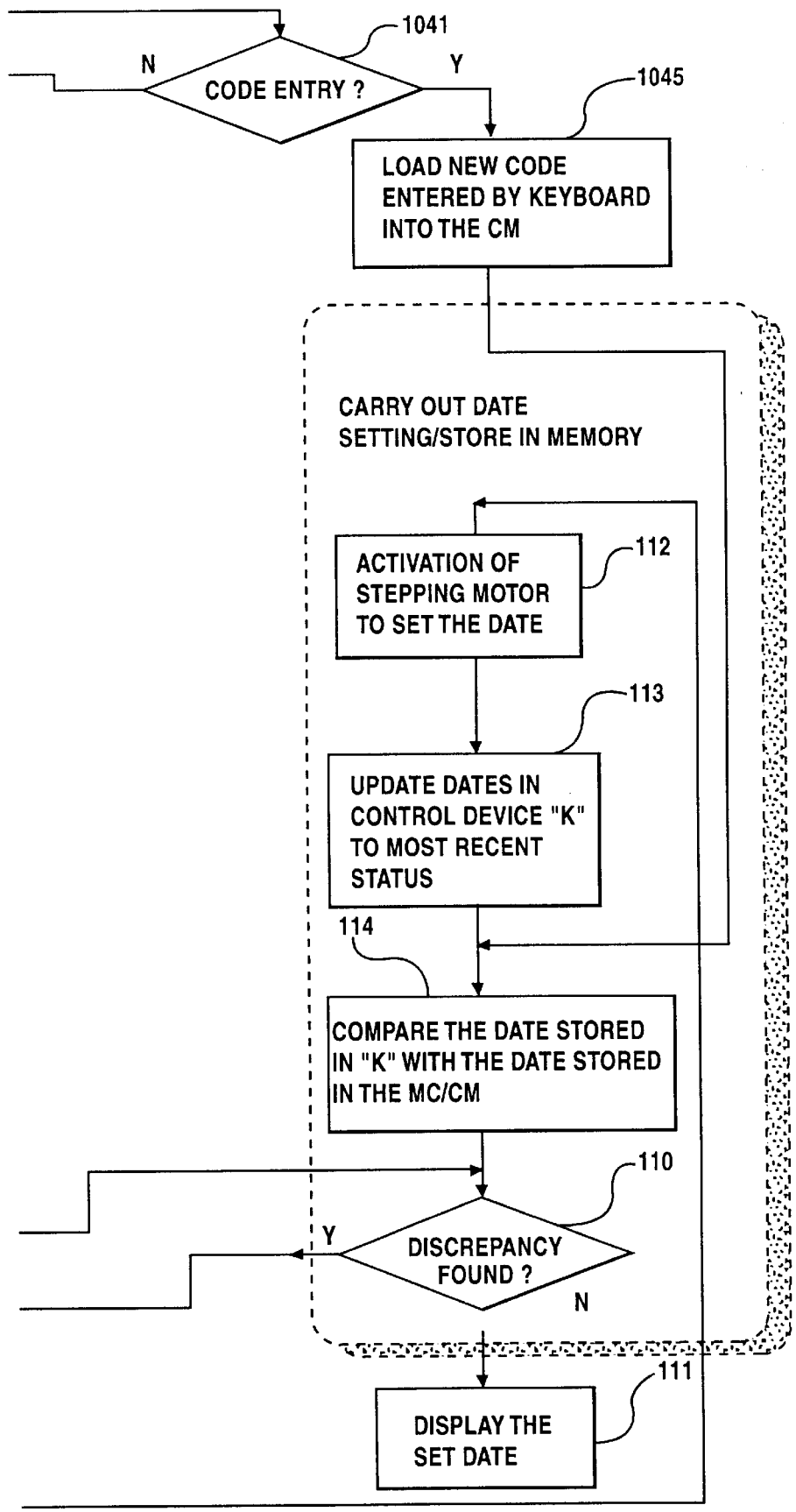
FIG. 3*a* is an expanded flowchart for a mechanical print mechanism.
Figure 3B:
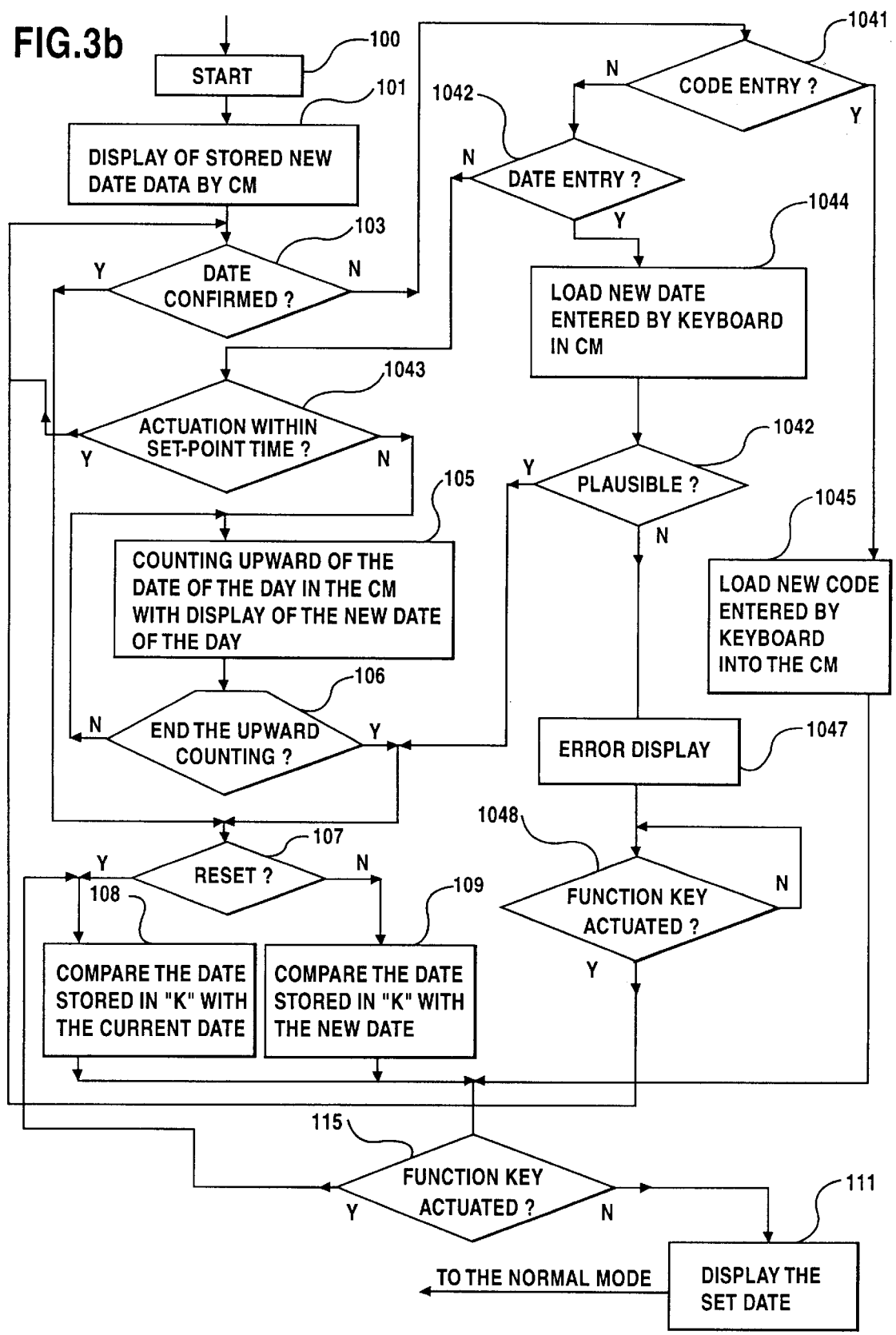
FIG. 3*b* is an expanded flowchart for a nonmechanical print mechanism.

Polling takes place in steps 103, 104 in conjunction with a program or logic of the electronic logic circuit. Provision is made so that the new or current date displayed can be confirmed by means of a function key D. If the function key D is actuated again, then the difference that may be present between the new date for the predating and the current date is reset to zero for the normal postage metering operation. On the other hand, if after the postage meter is turned on no actuation of the keyboard or function key D takes place, then the date is incremented by one day after a predetermined period of time has elapsed, such as for instance two seconds. It will be understood that in this way only predating but no back-dating can be done. The calendar module permits only valid date values. Invalid values are detected by means of a plausibility check, and an error is signaled. That is, if the postage value keyboard T or function key D is actuated for an input, then the logic and/or the program of the electronic logic decides whether predating or some other entry is to be done. Step 104, for a second variant, includes corresponding substeps 1041, 1042, 1043, etc. for detecting the user input operations that are shown in FIGS. 3a and 3b. Aside function keys, other equivalent actuating means and even chip cards can be used that initiate an operation or that prevent or reset the tripping of an operation.

If the intention is to maintain the current date, then finally step 110 is reached, so that optionally via the steps 112, 113 and 114 a change in the setting can be made, if the instantaneous setting of the type wheels or the date does not match the current date.

If this is not the case, then in step 105 the date is incremented by one day and shown in the display. In step 106, a check is made as to whether the incrementing is ended, and the program then proceeds to step 107 if the operation of incrementation has been concluded. Otherwise a return to step 105 is made. In step 107, during a time period such as two seconds, a check is made as to whether the electronic presetting should be rescinded. For instance, if after steps 105 and 106 have been performed, where in step 106 the function key D has been actuated, then a jump from step 107 to 109 is made. After step 107, accordingly, a step 109 is reached in order to store the new date (datum) in memory according to the invention in the calendar module. Otherwise, a comparison is done with the values stored in memory in the means K. If from the very beginning no function key is actuated or if in other words in step 105 incrementing were done up to a limit value for the new date, which would also be recognized in step 106, then a jump is made to step 108. In this last case, in step 108 the current date is adopted by the electronic logic circuit MC, so that in the next step 110 the discrepancy from the aforementioned type wheel setting can be checked.

Figure 2B:
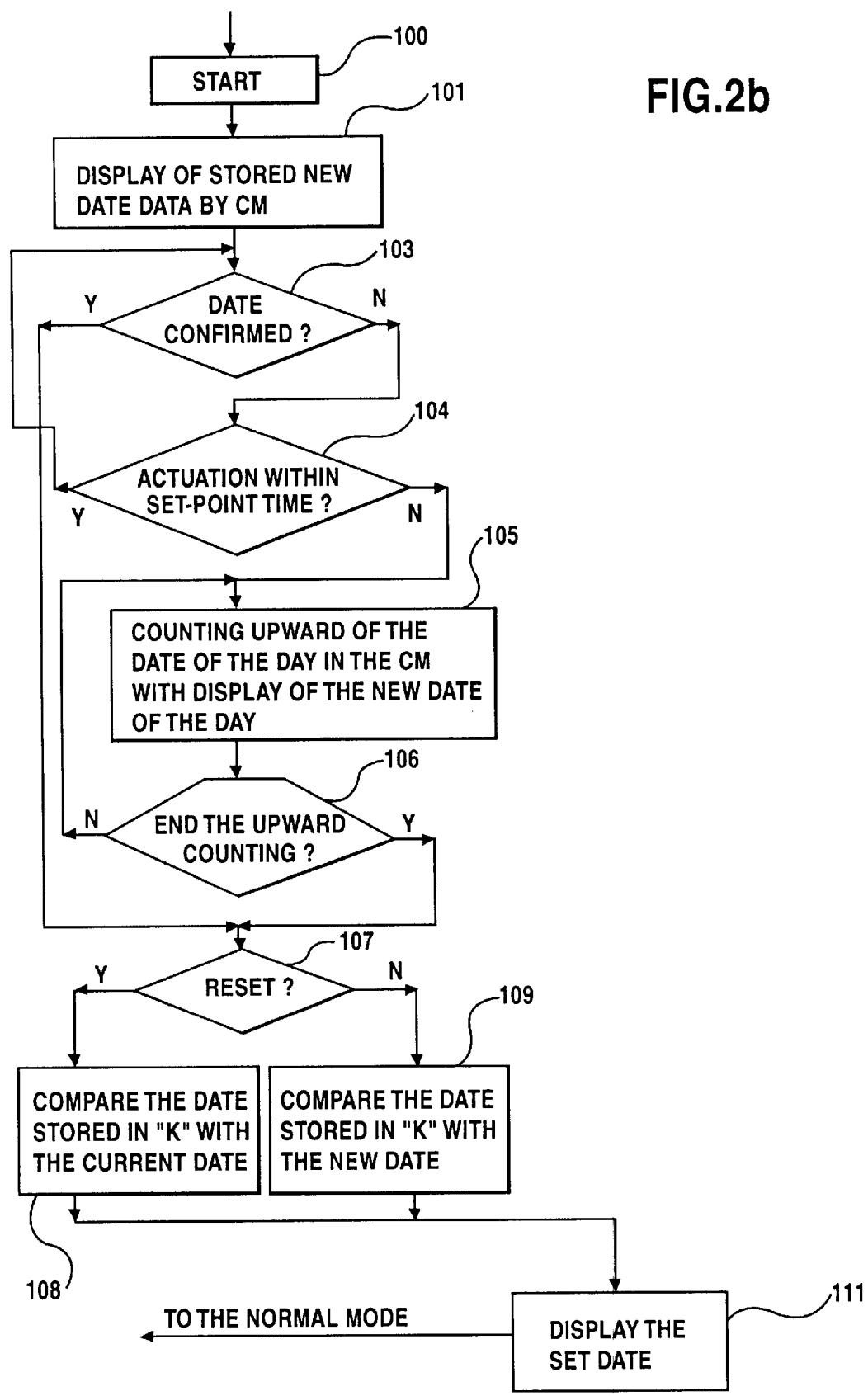
FIG. 2*b* is a flowchart for a nonmechanical print mechanism.

FIG. 2b shows a flowchart for a nonmechanical printer, which substantially matches that shown in FIG. 2a. However, a nonmechanical printing principle does not involve any type wheels or stepping motors for adjusting them or feedback via a control device K to the electronic logic MC. The control device K connected to the electronic logic MC is a nonvolatile memory in this case, for storing the date setting used in the previous printing operation.

Steps 110–114 (enclosed together in a box) may be omitted. Steps 108 and 109, in which the comparison with a date used in the preceding printing operation is made, make it possible in a following step 111 to produce a corresponding display, in particular with respect to a date change and/or predating. A jump back to the normal mode is then made to step 111.

FIG. 3a shows an expanded flowchart. After the start in step 100, the new date memorized in the calendar module is displayed (step 101), and the keyboard is monitored (repeated query) for data input. If the date is correct, then via step 107 a jump is made to step 109. If not, the jump is made to substep 1041 of step 104, which performs a query as to where a code has been entered. The term "code" is understood to mean a predetermined input combination that cannot be considered a date, an example being a code word.

If that is the same, then a jump is made to substep 1045 for storing the input code in memory in the nonvolatile memory of the electronic logic circuit MC. Otherwise a jump is made to step 1042, which checks whether a new date has been entered in the calendar module by means of the keyboard. If so, the program proceeds with substep 1044. If not, the program proceeds with substep 1043 in order to check whether it is still possible to expect actuation within a predetermined time. If that is the case, then a return to step 103 is made. If not, then the predetermined time period of, say, two seconds has been exceeded, and step 105 is reached. In step 105, the date is incremented by one day. Next, in step 106, it is checked whether the function key has been actuated in order to terminate the incrementation. If a predetermined number of incrementing steps have occurred then continuation of the incrementing is stopped automatically. If that is not the case, a jump back to step 105 is made, so that incrementing can continue until the function key has been actuated. From step 106, the process then proceeds to step 107. Provision is made so that the calendar module carries out memorizing of the current date and the difference between the new date and the current date in the nonvolatile memory, that the postage meter is turned on, and that by actuation of the function key, the difference from the current date is set to zero in the nonvolatile memory.

If a jump from substep 1042 to substep 1044 has been made because an entry of a date has been detected, then according to the invention the new date is stored in nonvolatile memory in the calendar module GM. In contrast to this, in step 1045 memory storage in the electronic logic circuit is done, since a code would not produce a plausible date setting.

Specifically, a plausibility check of the manually entered date is done in conjunction with the calendar module CM. The plausibility check is carried out by comparison with the current date stored in memory in the nonvolatile memory NVM of the calendar module CM, and any impermissible input combinations or code that are stored in nonvolatile memory in the postage meter.

In a further variant, it is provided that a first actuation of a first function key produces acknowledgment of the new date, and that a second actuation of a second function key leads to automatic date setting, and an actuation of selected number keys in combination with the function key leads to manual date setting; the electronic logic circuit carries out a plausibility check so that only a predating with plausible dates can be done. If an incorrect date, that is, a date that does not exist or an old date (back-dating) has been entered, then substep 1047 is reached, so that an error report can be made via the display, or at least the error is signaled. This latter is done, for instance by having the display blink, or by signaling the error acoustically by means of a beeper. A return is also made to step 103, if it is found in step 1048 that a function key was actuated. However, if the newly entered date is plausible, then step 107 is reached.

Step 106 likewise includes a substep for plausibility checking. If a date was reached in the incrementing that should be blanked out (the date of a holiday and similar dates), then the incrementing is not yet ended even if the function key is actuated. In that case, the incrementing is not terminated until a plausible date is reached.

Before step 104 or as a substep in step 104, at least one additional step 1041 can be inserted, which detects whether a code word or a date has been entered.

The electronic logic circuit is preferably a central processor unit (CPU). By way of example, a suitable processor is the Philips 80C851 or 83C851 CMOS one-chip 8-bit microcontrol device with a nonvolatile 256×8-bit E$^2$PROM as the internal processor memory. The code word can be stored in nonvolatile memory over 50,000 times in the aforementioned internal processor memory. The data content is likewise guaranteed for 10 years. Another suitable processor, for example, is the Texas Instruments TMS 370C010, which also has an internal 256 byte E$^2$PROM.

Manual entry within a time period can be made, and after the time period has elapsed the date is set by automatic date setting and/or predating or a data-free setting. The CPU checks whether the entered date is plausible; if not, an error is signaled (blinking of the display or beeper, special symbol). Provision is made so that a comparison is carried out after the manual input as to whether a plausible date has been entered, and a return to the input step is made if a function key is actuated (in substep 1048). After actuation of the function key, the entry can be repeated until the postage meter adopts the entry as the new date or code.

The type wheels of the data print mechanism are embodied such that they have at least one blank space. This blank space, that is, a space without a digit, or with a symbol such as a star or dash or the like instead of a digit, is intended for date-free setting, as is requested by some postal service administrations. This is done by actuating zero in the aforementioned manner for the date-free setting. There is provision so that a predetermined date not suitable as a data word for the predating is used as the code word.

One allowable input combination is 000000. This sextuple zero entry serves the purpose of data-free setting. The CPU detects the code in step 1041 and stores the code in memory in step 1045 and shows it in the display and makes a corresponding setting, but does not actually print the zeros. From substep 1045, a jump to step 114 is made for that purpose. After the comparison in step 114, a discrepancy in step 110 and the activation of the stepping motors ST in step 112 and setting of the type wheel take place and the position is stored in the device K (step 113). Next, the code word from the CPU is compared (step 114) with the data stored in the device K and then step 110 is reached, from which a jump back to step 112 is made if a discrepancy is found in step 110 and no function key D has been actuated in step 115 to switch the setting back to the current date. To that end, a jump to step 108 is made.

When the postage meter is turned on, whatever date is stored in memory is initially displayed for a limited time, such as two seconds. After a new date has possibly been entered, then in step 111 the new, current or corrected date is made visible on the display device AZ, if no discrepancy in the setting is found in step 110.

The means for adjusting the type wheels are merely preferably racks in motion. Equivalent means are likewise usable to actuate the type wheels and are driven by a stepping motor.

The invention can also be applied to thermal transfer or other nonmechanical printers. In a nonmechanical printing principle, the control device K connected to the electronic logic MC is once again a nonvolatile memory for storing the setting of the date used in the preceding printing.

In FIG. 3*b*, an expanded flowchart for a nonmechanical printer is shown, which substantially matches that shown in FIG. 3*a*. However, steps 110–114 (in a box) are omitted here again. From steps 108, 109 and 1045, one goes directly to a step 115, in which polling as to actuation of a function key is done, with a subsequent return then to step 103. Otherwise, a jump to step 111 for display is made.

Steps 108 and 109, in which the comparison with a date used in the preceding printing is made, make it possible in an ensuing step 111 to effect a corresponding display, especially with respect to a change of date and/or predating. From step 111, a return is then made back to the normal mode, if no further function key is actuated within a predetermined period of time, which is again ascertained in a step 115.

The method includes the following essential steps:

a) entry of the date by means of the existing keyboard in conjunction with a function key for the date setting or automatically counting up to predate the date.

b) actuating the function key in order to prevent at least the predating of the date;

c) comparison of the changed date with the previously stored date by means of the control device, in order to change the date to be printed if needed;

d) output of a print command to print a postage imprint, including the new or changed or current date.

A further variant includes the following steps:

a) actuating a first function key for acknowledgment and optionally actuating a second function key for resetting the new date to the current date.

b) comparing the changed date to the date stored previously by means of the control device, in order to change the date to be printed if needed;

c) output of a print command to print a postage imprint, including the new or changed or current date.

Another variant includes the following steps:

a) actuating a second function key to reset the new date to the current date;

b) comparing the changed date to the date stored previously by means of the control device, in order to change the date to be printed if needed;

c) output of a print command to print a postage imprint, including the new or changed or current date.

The invention is not limited to the present embodiment, since it will be appreciated that further embodiments of the method can be developed or used in other configurations, or for nonmechanical printers.

I claim:

1. A method for setting the date in an electronically controlled postage meter, wherein the postage meter has an electronic logic circuit and a calendar module, a date print mechanism with date wheels for printing a date and a postage print mechanism with print wheels for printing postage values, the method which comprises:

storing at least one current date in a memory of the calendar module connected to the electronic logic circuit;

setting postage values and inputting data into the electronic logic circuit through a keyboard connected to the electronic logic circuit;

automatically counting upward with the electronic control unit without actuating a function key, for predating the date;

inputting a date through a function key connected to the electronic logic circuit by actuating the function key in order to prevent at least an automatic predating of the date;

comparing, with the electronic logic circuit, the date received in the inputting step with the current date stored in the calendar module memory;

if the dates are found to be different in the comparing step, indexing the date wheels in the date print mechanism, by activating the stepping motors with the electronic logic circuit coupled to the stepping motors; and repeating the comparing and indexing steps until the dates are found to be identical in the comparing step.

2. The method according to claim 1, which further comprises actuating the function key once more for preventing the predating and for resetting the setting to the current date.

3. The method according to claim 1, which further comprises storing in the non-volatile calendar module memory the current date and a difference between the new date and the current date; and setting the difference from the current date to zero upon turning on the postage meter and upon actuating the function key.

4. The method according to claim 1, which further comprises acknowledging the new date by actuating the function key; initiating an automatic setting of the new date by actuating the function key again; and initiating a manual setting of the new date by actuating selected number keys in combination with the function key; and performing a plausibility check with the electronic logic circuit so that only date predating with plausible dates is possible.

5. A method for setting the date in an electronically controlled postage meter, wherein the postage meter has an electronic logic circuit and a calendar module, a date print mechanism with date wheels for printing a date and a postage print mechanism with print wheels for printing postage values, the method which comprises:

storing at least one current date in a memory of the calendar module connected to the electronic logic circuit;

setting postage values and inputting data into the electronic logic circuit through a keyboard connected to the electronic logic circuit;

automatically indexing with the electronic control unit without actuating a function key, for incrementing the date;

inputting a date through at least a first function key connected to the electronic logic circuit by actuating the first function key for acknowledging the new date and, selectively, actuating a second function key for resetting the new date to the current date;

comparing, with the electronic logic circuit, the date received in the inputting step with the current date stored in the calendar module memory;

if the dates are found to be different in the comparing step, indexing the date wheels in the date print mechanism, by activating the stepping motors with the electronic logic circuit coupled to the stepping motors;

repeating the comparing and indexing steps until the dates are found to be identical in the comparing step.

6. An improved method of setting the date in an electronically controlled postage meter, wherein the postage meter has an electronic logic circuit and a calendar module, a date print mechanism with date wheels for printing a date and a postage print mechanism with print wheels for printing postage values, wherein:

at least one current date is stored in a memory of the calendar module connected to the electronic logic circuit;

postage values are set and data are input into the electronic logic circuit through a keyboard connected to the electronic logic circuit;

a date is input through a function key connected to the electronic logic circuit;

the electronic logic circuit compares the date input through the function key with the current date stored in the calendar module memory, and, if the dates are found to be different, the date wheels in the date print mechanism are indexed with the stepping motors; and the comparison and the indexing are repeated until the dates are found to be identical;

the improvement which comprises:

inputting the date by automatically indexing upward with the electronic control unit for incrementing the date, the automatic indexing being performed without actuating the function key and actuating the function key in order to prevent at least the automatic incrementing of the date; and inputting data in the keyboard, and transmitting an input signal from the keyboard to the electronic logic circuit, for entering digits, comparing, and setting the date wheels.

7. The method according to claim 6, which further comprises, subsequently to the inputting step, checking whether or not a plausible date has been entered in the inputting step, and returning to the inputting step if a function key is actuated.

8. The method according to claim 6, which further comprises: allowing manual date entry for only a predetermined time period and, if no manual entry is made during the predetermined time period, automatically setting the date and/or predating.

9. An improved method of setting the date in an electronically controlled postage meter, wherein the postage meter has an electronic logic circuit and a calendar module, a date print mechanism with date wheels for printing a date and a postage print mechanism with print wheels for printing postage values, wherein:

at least one current date is stored in a memory of the calendar module connected to the electronic logic circuit;

postage values are set and data are input into the electronic logic circuit through a keyboard connected to the electronic logic circuit;

a date is input through a function key connected to the electronic logic circuit;

the electronic logic circuit compares the date input through the function key with the current date stored in the calendar module memory, and, if the dates are found to be different, the date wheels in the date print mechanism are indexed with the stepping motors; and the comparison and the indexing are repeated until the dates are found to be identical;

the improvement which comprises:

inputting the date by automatically indexing upward with the electronic control unit for incrementing the date, the automatic indexing being performed without actuating the function key and actuating the function key in order to prevent at least an automatic incrementing of the date; and inputting data in the keyboard, and transmitting an input signal from the keyboard to the electronic logic circuit, for entering a code, comparing, and setting the date wheels.

10. The method according to claim 9, which further comprises entering a code word as the code which is not suitable as a data word for incrementing the date.

11. A method for setting the date in an electronically controlled postage meter with a printer and a control device connected thereto, a battery-backed-up calendar module for storing at least one current date in memory, the module being connected to the control device, a keyboard connected to the control device for inputting a postage value and inputting data into the control device, a ten-key keypad for setting a postage value, and a function key connected to the control device, the method which comprises:

changing the date in the postage meter by entering the date via the ten-key keypad in combination with the function key or automatic incrementation of the date by upwardly indexing the date without actuating the function key;

actuating the function key for preventing the automatic incrementation of the date;

comparing the changed date with a date previously stored with the control device, in order to change the date to be printed if needed; and outputting a print command for printing a postage imprint with new, changed or current date.

12. The method according to claim 11, which further comprises actuating the function key once more for resetting a setting to the current date.

13. The method according to claim 11, which further comprises storing in the non-volatile calendar module memory the current date and a difference between the new date and the current date; and setting the difference from the current date to zero upon turning on the postage meter and upon actuating the function key.

14. The method according to claim 11, which further comprises acknowledging the new date by actuating the function key; initiating an automatic setting of the new date by actuating the function key again; and initiating a manual setting of the new date by actuating selected number keys in combination with the function key; and performing a plausibility check with the control device so as to enable only date incrementation with a plausible date.

15. A method for setting a date in an electronically controlled postage meter, the postage meter including a printer and an associated control device, a battery-backed-up calendar module connected to the control device and having a memory for storing a current date, a keyboard connected to the control device for inputting postage values and inputting dates into the control device, and a first and a second function key connected to the control device, the method which comprises:

predating to a changed date by automatically counting upward with the control device, the automatic counting upward being performed without actuating the first or second function key, and actuating the first function key for acknowledging the changed date and, if required, actuating the second function key and resetting the changed date to the current date;

comparing the changed date with a previously stored date by the control device, and changing the date to be printed with the postage meter in dependence of the comparison;

and outputting of a print command with the control device and printing a postage imprint including the changed date or the current date.

16. An improved method for setting a date in an electronically controlled postage meter, the postage meter including a printer and an associated control device, a battery-backed-up calendar module connected to the control device for storing at least one current date in a memory, a keyboard connected to the control device for inputting postage values and inputting dates into the control device, and at least a first function key that is connected to the control device; wherein the date is changed for predating to a new date, the changed date is compared by the control device with the previously stored date, the date to be printed is changed if needed, and a print command is output for printing a postage imprint with the new, changed or current date, the improvement which comprises:

predating to the new date by automatically counting upward with the control device, the automatic counting upward being performed without actuating the at least first function key, and actuating the function key for acknowledging the new date; and providing a second function key and actuating the second function key to reset the predated new date to the current date.

17. An electronically controlled postage meter, comprising:

a control device controlling functions of the postage meter, a printer module connected to said control device, a calendar module connected to said control device with a memory for storing at least one current date;

a keyboard connected to said control device for inputting postage values and inputting dates into said control device, said control device including means for automatically counting upward without operating a key, for incrementing a date;

a function key connected to said control device for selectively preventing upwardly incrementing the date;

said control device comparing the entered date with the date stored in said calendar module and changing the date to be printed in dependence on the comparison; and said control device outputting a print command for printing a postage imprint with a new, changed or current date.

18. The apparatus according to claim 17, wherein said control device is an electronic logic circuit with:

means for automatically counting upward for incrementing the date; and means responsive to an actuation of said function key for selectively preventing an automatic predating of the date.

19. The apparatus according to claim 18, wherein said the electronic logic circuit is responsive to a further actuation of said function key for resetting the setting to the current date.

20. The apparatus according to claim 18, wherein said function key is a first function key, and including a second function key, said electronic logic circuit being responsive to an actuation of said further function key for resetting the setting to the current date.

* * * * *

UNITED STATES PATENT AND TRADEMARK OFFICE
CERTIFICATE OF CORRECTION

| | |
|---|---|
| PATENT NO. | : 5,881,020 |
| DATED | : March 9, 1999 |
| INVENTOR(S) | : Ralf Kubatzki |

It is certified that error appears in the above-identified patent and that said Letters Patent is hereby corrected as shown below:

<u>Title page,</u>
Item [73] should read as follows:
Assignee: Francotyp-Postalia AG & Co., Birkenwerder, Germany
Item [30] should read as follows:
June 1, 1995    [DE]    Germany...... 195 20 898.6

Signed and Sealed this

Second Day of October, 2001

Attest:

NICHOLAS P. GODICI
*Acting Director of the United States Patent and Trademark Office*

*Attesting Officer*